United States Patent [19]

McKinnon et al.

[11] 3,973,584

[45] Aug. 10, 1976

[54] PIERCING VALVE FOR TAPPING PIPELINES

[75] Inventors: Eugene T. McKinnon, Pacific Palisades; Alvin S. Drutz, Los Angeles; Randall C. Danta, Reseda, all of Calif.; Niklas F. Zetterberg, Bend, Oreg.

[73] Assignees: Eugene T. McKinnon, Pacific Palisades; Alvin S. Drutz, Los Angeles both of Calif. ; a part interest to each

[22] Filed: Feb. 18, 1975

[21] Appl. No.: 550,704

[52] U.S. Cl. .............................................. 137/318
[51] Int. Cl.² ..................... F16K 43/00; F16K 51/00
[58] Field of Search...................... 137/315, 317, 318

[56] References Cited
UNITED STATES PATENTS

| | | | |
|---|---|---|---|
| 2,875,777 | 3/1959 | Lacart............................ | 137/318 |
| 3,038,490 | 6/1962 | Yocum........................... | 137/318 |
| 3,162,211 | 12/1964 | Barusch.......................... | 137/318 |
| 3,198,206 | 8/1965 | O'Brien........................... | 137/318 |
| 3,252,474 | 5/1966 | Ehrens et al..................... | 137/318 |
| 3,252,475 | 5/1966 | Jones............................... | 137/318 |
| 3,336,937 | 8/1967 | Ehrens et al..................... | 137/318 |
| 3,428,075 | 2/1969 | Wagner............................ | 137/318 |

*Primary Examiner*—Martin P. Schwadron
*Assistant Examiner*—George L. Walton
*Attorney, Agent, or Firm*—Mahoney, Schick & Cislo

[57] ABSTRACT

Upper and lower blocks with registering grooves are assembled about a pipeline with an upper block piercing needle moved downwardly piercing the pipeline. The piercing needle is then moved upwardly providing communication through the pipeline pierced hole and into a transfer passageway of the upper block. A resilient O-ring is positioned within an annular chamber spaced outwardly of a lower portion of the piercing needle compressed upwardly against the upper block and downwardly against the pipeline to seal the upper block groove from the pipeline pierced hole. The lower block groove is formed semi-circular in transverse cross section and the upper block groove is formed semi-elliptical in transverse cross section with the pipeline being deformed totally conforming to the block grooves when the blocks are brought into assembled abutment.

4 Claims, 5 Drawing Figures

PIERCING VALVE FOR TAPPING PIPELINES

BACKGROUND OF THE INVENTION

This invention relates to a piercing valve for tapping pipelines and more particularly, to such a valve commonly used, for instance, in safely tapping a gas line of a refrigeration system for exhausting pressurized gas therefrom and recharging the same during repair operations. According to certain improvements of the present invention, a unique and simplified seal arrangement is provided between the valve assembly and the section of pipeline upon which the valve is mounted insuring complete sealing against the escape of pressurized gas other than through the intended transfer passageway between the valve and pipeline. Furthermore, according to certain other improvements of the present invention, an improved gripping and abutment between the valve and pipeline section is obtained which deforms the pipeline section into a shape permitting easier and more positive piercing thereof and also enhancing the foregoing sealing features.

Various similar forms of piercing valves for tapping pipelines have heretofore been provided, one of the principle uses being in the refrigeration repair industry. In the repair of refrigeration systems, for various reasons including the particular confined area of the refrigeration system installation, it is most frequently difficult, if not impossible, to gain access to the interiors of the various pressurized gas pipelines by normal disconnection procedures for the exhaustion of pressurized gas therefrom and the recharging of the same. For this reason, piercing valves for tapping such pipelines are commonly used by refrigeration repairmen, such valves being constructed capable of mounting over virtually any exposed pipeline section and having means incorporated therewith for piercing the particular pipeline to exhaust pressurized gas therefrom and recharge the pipeline system through a transfer passageway of the valve.

In general, such piercing valves have been comprised of assemblable blocks which may be assembled telescoping a pipeline section which is presented for convenient access. A piercing needle operably mounted in one of the blocks is then moved inwardly to pierce the particular pipeline section and upon opposite piercing needle movement, a communication is provided from the interior of the pipeline section through the pierced hole, through a portion of the piercing needle opening and into a transfer passageway of the valve block. In this manner, by exterior connection to the transfer passageway of the valve assembly, pressurized gas may be removed from the refrigeration pipeline system and the pipeline system recharged as is appropriate.

One of the major problems in the use of the prior piercing valve constructions has been of establishing a proper seal between the valve assembly and the particular pipeline section in order to prevent the leakage of pressurized gas from the valve assembly other than through the intended transfer passageway, that is, through the pierced hole of the pipeline section once established and outwardly along the outer circumferential surface of the pipeline section between the valve assembly and the pipeline section while the pressurized gas is flowing between the pipeline section interior and the intended transfer passageway of the valve assembly. The seriousness of this problem can be more greatly appreciated when it is realized that once the repair operations have been completed, there is no means of completely closing the pierced hole of the pipeline section so that the piercing valve that was used during the repair operations must be left assembled about the pipeline section and depended upon, once the transfer passageway is capped, to prevent pressurized gas leakage over a long period of time from the particular refrigeration pipeline system. Obviously, even if a minute unwanted pressurized gas leakage is permitted, the refrigeration system will ultimately fail.

One of the more common sealing means used in the prior piercing valves in an attempt to solve these sealing problems has been comprised of a pad of various types of sealing materials mounted against the valve block surface overlying the outer surface of the valve section to be pierced and surrounding the location of the ultimately pierced hole. In other words, in the piercing valve constructions, registering semi-circular grooves are formed in the valve block surfaces which are ultimately brought into abutment surrounding the valve section and with the valve section located in these grooves. Usually, the piercing needle is mounted in the valve upper block so that the sealing pad, usually consisting of a thin rectangular sheet of seal material, is mounted against the surface of the upper block within the upper block groove against the outer surface of the pipeline section surrounding the location of the ultimately formed pipeline pierced hole with compression between the valve blocks and the pipeline section outer surface depended upon to establish the sealing action over a relatively wide surface between the valve upper block and pipeline section.

In order to provide a completely operable sealing action, therefore, the grooves of the valve sections must conform quite closely to the contour of the pipeline section so that a relatively even seal material compression is maintained, otherwise leak paths will be established along the various surfaces. Furthermore, where shims are used, usually in the valve lower block groove, for adapting the particular piercing valve to a series of different pipeline diameters, the problem of establishing relatively even compression in this sealing action is even more greatly magnified. The overall result is that with the prior piercing valve constructions, the important sealing actions have been quite unpredictable and troublesome with frequent leakage failures.

A still further serious problem encountered with the prior piercing valve constructions has involved the pipeline piercing operation, the ultimate piercing of the pipeline by the piercing needle to provide the required communication between the pipeline interior and the transfer passageway of the valve. Unless exact alignment and secure positioning of the pipeline section by the piercing valve blocks is maintained, penetration of the piercing needle through the wall of the pipeline section can be inhibited and a difficult hole piercing operation results. In extreme situations, even slight deformation of the pipeline section can occur during this hole piercing operation which can even further complicate the foregoing sealing problems. This same pipeline deformation danger with its complicating results is even more possible where the securing of the piercing valve blocks causes a flattening deformation of the pipeline section at the area of intended piercing needle penetration since it is fundamental that the more flat the pipeline section wall against which the needle penetrating force is exerted, the less strength against deformation.

OBJECTS AND SUMMARY OF THE INVENTION

It is, therefore, an object of this invention to provide a piercing valve for tapping pipelines which may incorporate improved sealing means structure therein in the area of the pipeline section pierced hole preventing the unwanted escape of pressurized gas which can later cause difficulties in that particular pipeline system. The improved sealing means of the present invention is of a highly efficient nature eliminating the necessity of extreme compression between the piercing valve and pipeline section over a wide area, yet such sealing means is of maximum simplicity, far more simple than those of the prior constructions. In the preferred form of the sealing means, an annular seal chamber is formed in the valve upper block surrounding the lower end of the piercing needle and opening into the upper block groove and a resilient material O-ring is positioned in such seal chamber spaced outwardly of the piercing needle lower end and the area of the pierced hole to be formed through the pipeline section. When the valve upper and lower blocks are brought into assembly telescoping the pipeline section, the resilient material O-ring is compressed between the upper block and the pipeline section so as to create an efficient seal spaced outwardly of and surrounding the ultimately pierced hole in the pipeline section.

It is a further object of this invention to provide a piercing valve for tapping pipelines which, when assembled over the pipeline section, telescopes and grips the pipeline section in an improved manner so as to present the pipeline section in the most ideal shape for maximum efficiency in the ultimate hole piercing operation. Again, according to the preferred embodiment, the lower pipe section groove of the lower block is formed of usual semi-circular cross section, but the registering pipeline groove of the upper block is formed of a novel generally semi-elliptical cross section, that is, the lower portion of this upper block groove is formed having a greater cross sectional radius than the upper portion thereof. Thus, when the upper and lower blocks of the piercing valve are assembled surrounding the pipeline section, drawing such halves into full assembly forces the pipeline section to slightly deform and protrude upwardly at a sharper curvature or cross sectional radius presenting a more sharply curved and, therefore, more rigid and strong pipeline wall at the area where the pierced hole is to be formed and eliminating the later dangers of unwanted deformation during the hole piercing operation.

It is still a further object of this invention to provide a piercing valve for tapping pipelines which accomplishes the immediately foregoing improved telescoping and gripping advantages by deforming the pipeline section telescoped and gripped by the piercing valve blocks totally conforming to the block grooves. More particularly, starting with the pipeline section having the usual circular cross section, as the piercing valve blocks are brought into assembly, the pipeline section is deformed so as to exactly conform to the non-circular cross section of the block grooves, thereby closely abutting the surfaces of such block grooves totally around the periphery of the pipeline section. Furthermore, when various sized shims are positioned in the lower block groove in order to adapt the piercing valve to various sizes of pipelines, the sizes of the shims are predicated to produce this same complete pipeline section conformation even over the steps formed by the upper termination edges of the particular shims.

Thus, with this precalculated deformation and complete pipeline section conformation to the groove shapes of the upper and lower piercing valve blocks, reshaping for the more efficient hole piercing operation in the pipeline section as hereinbefore discussed is assured regardless of slight differences in pipeline sizes and regardless of adaptation of the piercing valve to various different pipeline sizes. At the same time, this same deformation and groove complete conformation of the pipeline section augments the previously discussed improved sealing against pressurized gas leakage around the pipeline ultimately pierced hole. The shape of the pipeline section wall in the area of the ultimately pierced hole will always be exactly the same regardless of the size of pipeline so that the seal engagement with the outer surfaces of the pipeline section will always be predictably the same assuring an efficient sealing operation.

Other objects and advantages of the invention will be apparent from the following specification and the accompanying drawings which are for the purpose of illustration only.

DESCRIPTION OF THE BEST EMBODIMENT CONTEMPLATED

Figure 1:
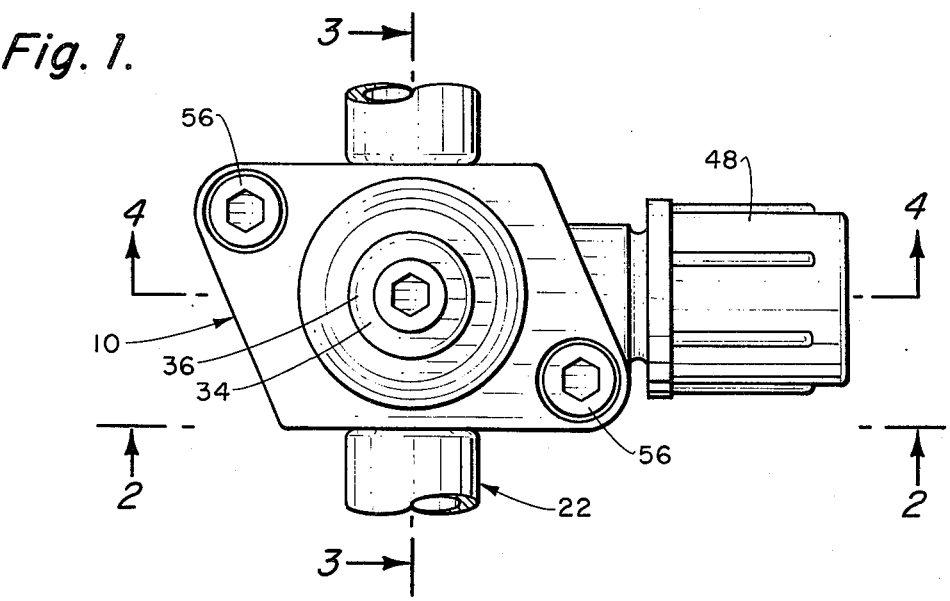
FIG. 1 is a top plan view of a preferred embodiment of the piercing valve for tapping pipelines of the present invention shown assembled surrounding a pipeline section.

Referring to the drawings, a preferred embodiment of the piercing valve for tapping pipelines is illustrated assembled in operable position telescoping a typical pipeline section. Generally, the piercing valve may be formed of appropriate usual material and by usual manufacturing procedures except as hereinafter specifically pointed out. Furthermore, again except as hereinafter pointed out, although the various components of the piercing valve are formed having specific shapes and contours, it is not intended to limit the broader principles of the present invention to the specific forms shown, but rather, the principles of the present invention should be broadly construed within the limitations presented by the prior art.

More specifically, the embodiment of the piercing valve of the present invention includes vertically assemblable valve upper and lower blocks generally indicated at 10 and 12, respectively. The valve upper block 10 has a lower relatively flat surface 14 with a longitudinal groove 16 formed therein and extending completely longitudinally therethrough. The valve lower block 12 has an upper relatively flat surface 18 with a similar groove 20 formed therein and extending completely longitudinally therethrough registering with the upper block groove 16 in the valve assembly as shown. Thus, in general terms and to this extent similar to the prior constructions, the valve upper and lower blocks 10 and 12 may be assembled with the respective lower and upper surfaces 14 and 18 drawn into abutment and with the registering grooves 16 and 20 receiving and telescoping a pipeline section generally indicated at 22, the pipeline section, for instance, being a part of the pipeline system of a typical refrigeration unit.

Particularly according to the principles of the present invention, however, the groove 20 of the lower block 12 is formed of usual semi-circular transverse cross section throughout, while the groove 16 of the upper block 10 is formed generally semi-elliptical in transverse cross section throughout. In other words, approximately the lower one-half of the upper block groove 16 is formed with a greater or larger cross sectional radius and the approximately upper one-half of such groove is formed with a lesser or smaler cross sectional radius so that the groove approximately upper half appears to slightly bulge upwardly and has a sharper arcuate surface, all for an important purpose to be hereinafter discussed. Both of the grooves 16 and 20 are preferably of uniform dimensions throughout the longitudinal extents thereof.

In the particular instance illustrated herein, the lower block groove 20 is shown with a usual shim 24 positioned therein for adapting the registering upper and lower blocks 10 and 12 to a smaller cross sectional size of pipeline section 22 and the lower block groove 20 may be used without the shim 24 for a larger cross section of pipeline section or with radial thicknesses of lesser or greater dimensions to properly adapt the same to the particular pipeline section to be telescoped, gripped and pierced. The shim 24 preferably extends the longitudinal extent of the lower block groove 20 as shown and is retained positioned therein by a downward, circular cross section projection 26 received in a corresponding circular cross section depression 28 of the lower block groove. However, with a shim 24 of any size positioned in the lower block groove 20, the upper edges of such shim will form steps 30 longitudinally along the grooves 16 and 20 at the lower portion of the groove 16 and with these shims forming and still retaining the shape of the groove 20 generally semi-circular in transverse cross section.

The valve upper block 10 is formed with a generally vertical piercing needle opening 32 generally vertically therethrough opening upwardly of the block and opening downwardly transversely bisecting the groove 16. A piercing needle generally indicated at 34 is received in the needle opening 32 selectively Vertically adjustable through threaded engagement thereof with a mounting collar 36 secured to the upper block 10. Beneath the mounting collar 36, the piercing needle 34 is peripherally sealed for such selected vertical movement by a usual sealing ring 38 and the lower end of the piercing needle has the usual reduced diameter piercing tip 40.

Important to the principles of the present invention, an annular seal chamber 42 is formed in the upper block 10 surrounding the lower extremity of the needle opening 32. As shown, this seal chamber 42 is preferably formed as an enlargement of the needle opening lower extremity so as to open fully radially into the needle opening 32 and fully downwardly into and directly overlying the upper block groove 16. An annular seal 44 is positioned received in the seal chamber 42 at the transverse outer extremities thereof spaced transversely outwardly of the piercing needle 34 and preferably being an O-ring of sufficient cross sectional size so as to generally vertically compress between the upper block 10 and the outer surface of the pipeline section 22 positioned in the upper and lower block grooves 16 and 20 as will be hereinafter more completely described.

The upper block 10 is completed by a usual transfer passageway 46 formed therein opening inwardly intermediate of the needle opening 32 and opening outwardly of the upper block. Initially, the transfer passageway 46 is retained closed and sealed by a threaded cap 48 compressing a flat seal 50, but upon removal of the cap and seal, a threaded coupling 52 may be installed threadably attaching an auxiliary pipeline 54 in communication with the transfer passageway. Finally, the upper and lower blocks 10 and 12 are drawn into and retained in assembly by usual bolts 56 shown in FIG. 1.

In use of the embodiment of the piercing valve for tapping pipelines of the present invention illustrated herein, the valve upper and lower blocks 10 and 12 are assembled telescoping the pipeline section 22 at the particular location of the pipeline where a pierced hole is to be formed. In this case, in order to properly conform to the particular outer dimensions of the pipeline section 22 in the manner of the present invention, the groove 20 of the lower block 12 has the shim 24 properly positioned therein. Furthermore, at this stage, the piercing needle 34 is withdrawn (not shown) sufficient that the piercing tip 40 thereof has its lower extremity not lower than the annular seal chamber 42 so as to not protrude downwardly into the upper block groove 16.

As the bolts 56 are fully secured, the mating flat surfaces 14 and 18 of the upper and lower blocks 10 and 12 are drawn fully into abutment and due to the respective sizes of the upper block groove 16 and the shimmed lower block groove 20 relative to the pipeline section 22, the pipeline section is deformed so as to fully conform to the groove 16 and the shimmed groove 20 fully outwardly against the upper and lower blocks 10 and 12. This conformation of the pipeline section 22 fully to the upper and lower block grooves 16 and 20 includes the steps 30 at the upper edges or extremities of the shim 24 as shown. Such conformation also includes deformation and conformation of the pipeline section 22 in exact contour of the upper block groove 16.

The overall result is that the pipeline section 22 is now rigidly and firmly gripped by the upper and lower blocks 10 and 12 within the grooves 16 and 20, that is, rigidly supported by the upper and lower blocks. At the same time, the wall 58 of the pipeline section 22 is slightly bulged upwardly into a sharper radius at the upper portion thereof by the specific contour of the upper block groove 16 with such sharper radius contour increasing the rigidity thereof against downward forces as will be ultimately applied by the piercing needle 34 during the piercing operation. Still at the same time, the wall 58 of the pipeline section 22 tightly compresses the annular seal 44 in the annular seal chamber 42 against the upper block 10 and the outer surfaces of the wall to perfect a seal spaced outwardly around the piercing needle 34.

Figure 2:
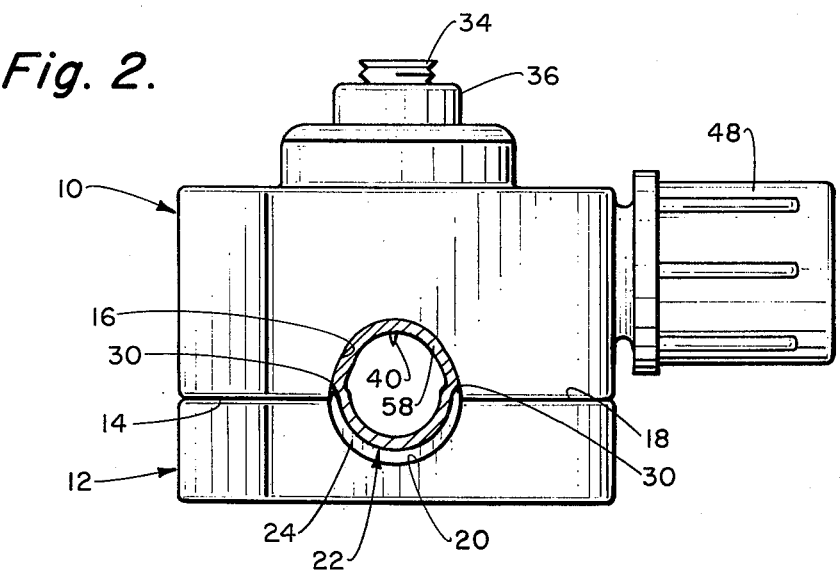
FIG. 2 is an end elevational view of the piercing valve of FIG. 1 looking in the direction of the arrows 2—2 in FIG. 1 and showing the piercing needle of the piercing valve in hole piercing position.
Figure 3:
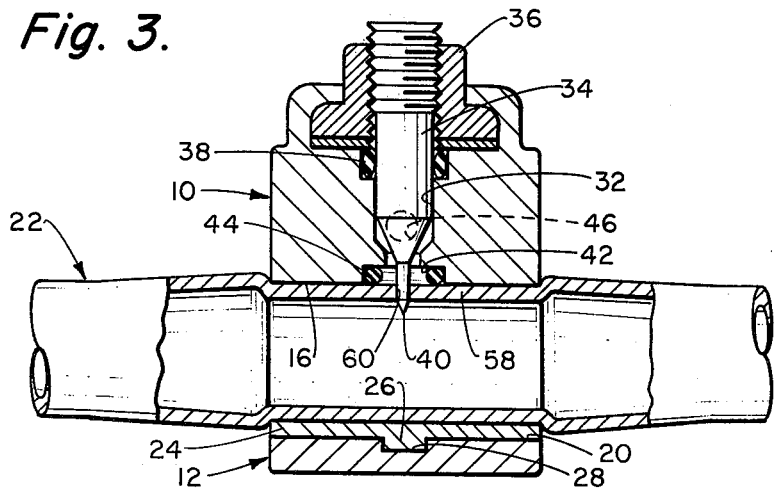
FIG. 3. is a vertical sectional view looking in the direction of the arrows 3—3 in FIG. 1.
Figure 4:
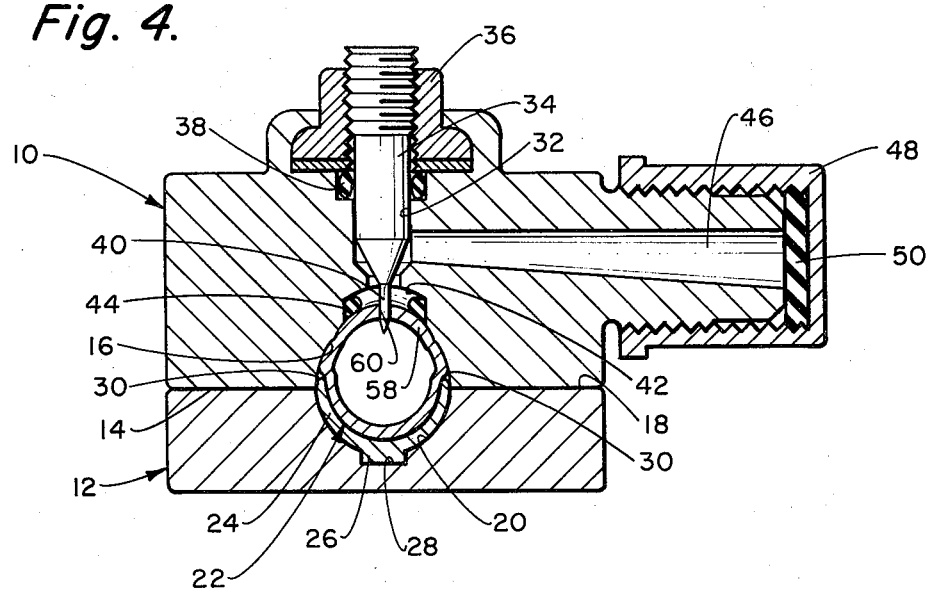
FIG. 4 is a vertical sectional view looking in the direction of the arrows 4—4 in FIG. 1.

At this stage directly prior to the actual piercing operation, if the pressurized gasses contained within the pipeline are of a noxious or dangerous nature, the cap and seal 48 and 50 of the upper block 10 may be removed and the coupling 52 installed with the auxiliary pipeline 54 to couple the upper block transfer passageway 46 with an auxiliary container, but if the pressurized gasses can be safely expelled into the atmosphere, this need not be done at this time. In any event, with the valve assembly now ready for the piercing operation, the piercing needle 34 is progressively threaded downwardly with the piercing tip 40 thereof engaging and penetrating through the wall 58 of the pipeline section 22 to form a pierced opening 60 as shown in FIGS. 2, 3 and 4. Due to the novel deformed, groove conforming and increased rigidified shape of the pipeline section 22, there is no danger during the piercing operating of any unwanted increased deformation thereof which could later cause the development of leakage paths for the contained pressurized gasses along the outer surface of the pipeline section 22.

Figure 5:
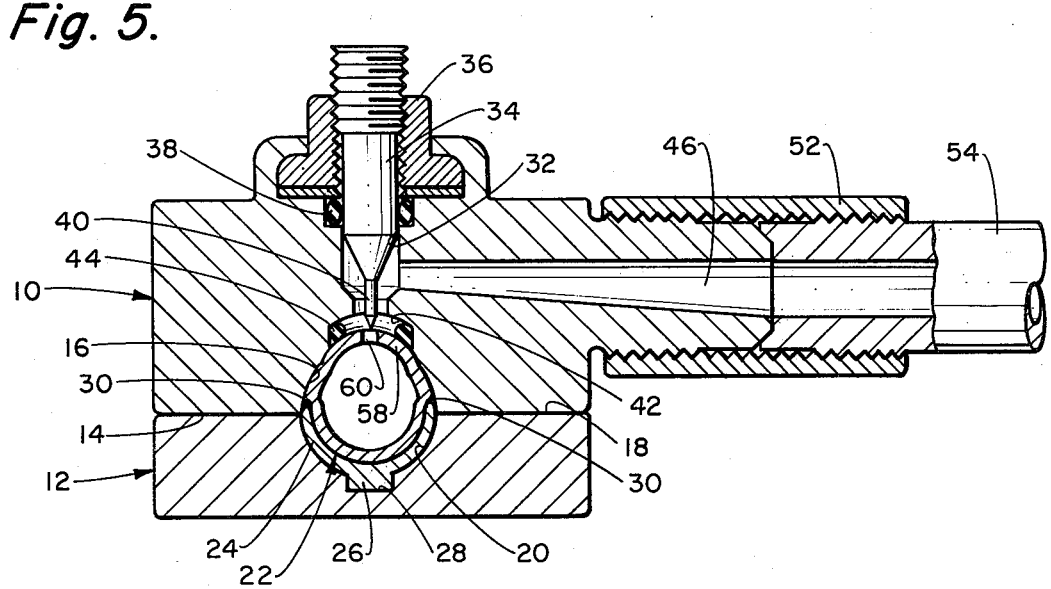
FIG. 5 is a view similar to FIG. 4, but showing the piercing needle withdrawn from the pierced hole and the transfer passageway of the piercing valve connected in communication with an auxiliary pipeline.

The piercing needle 34 is now withdrawn vertically upwardly as shown in FIG. 5 thereby establishing a communication from the interior of the pipeline section 22, through the pierced opening or hole 60 in the pipeline section wall 58, through the lower portion of the needle opening 32 and into the transfer passageway 46. Thus, the pressurized gasses within the pipeline may flow into the transfer passageway 46 and at an appropriate time, fresh pressurized gasses for recharging the pipeline system may be directed back through the auxiliary pipeline 54 and inwardly into the pipeline section 22 through the needle opening 32. Once the pipeline system is fully recharged with the pressurized gasses, the coupling 52 and the auxiliary pipeline 54 are removed and replaced by the cap 48 with the seal 50 finally sealing the valve assembly. This sealed valve assembly may be left permanently positioned on the pipeline section 22 permanently sealing the needle opening 32 and without any danger of pressurized gasses leaking through the needle opening 32 and longitudinally along the outer surfaces of the pipeline section due to the unique sealing features of the annular resilient seal 44 in the seal chamber 42, which seal now is not only vertically compressed against the pipeline section, but is radially outwardly compressed or urged against the upper block 10 by the increased pressure exerted by the contained pressurized gasses.

According to the principles of the present invention, therefore, a piercing valve for tapping pipelines is provided which may include a specific groove contour for receiving the pipeline section 22 to be pierced which upon complete assembly of the valve upper and lower blocks 10 and 12 deforms the pipeline section into a slightly upwardly bulged and full groove conforming shape to increase to rigidity of the pipeline section wall 58 so that the same is highly resistant to any unwanted additional deformation during the piercing operation with the piercing needle 34 which could cause the establishment of unwanted pressurized gas leakage from the pipeline system either during exhaustion and recharging of the same or at a later time during use. Furthermore, the unique piercing valve structure of the present invention may include an improved sealing means which virtually eliminates the difficulties with the prior constructions of pressurized gas leakage along the outer surfaces of the pipeline section 22 from the pierced hole or opening 60 once established and particularly over a long period of useful life after the exhaustion and recharging uses of the valve construction have been completed. Still further, where both of the unique improvements of the present invention are incorporated in a piercing valve construction, the reforming and rigidifying of the pipeline section 22, the one novel feature, serves to augment the unique sealing structure thereof, the other novel feature, the deformation and rigidifying of the pipeline section presenting an outer pipeline section surface ideally to the sealing structure and retaining the pipeline section in such form with the improved sealing over a long period of useful life.

We claim:

1. In a line tap valve of the type having upper and lower blocks with registering grooves therein for assembly secured abutting and telescoping a normally circular transverse cross section pipeline to be tapped, the upper block mounting a generally vertically adjustable and peripherally sealed piercing needle selectively movable downwardly through a needle opening penetrating the upper block groove to transversely pierce an opening in an upper part of the pipeline, said needle being then movable back upwardly providing communication through the pipeline pierced opening and the needle opening into a transfer passageway of the upper block; the improvements comprising: an annular seal chamber in said upper block surrounding said needle opening including an enlargement at a lower portion of said needle opening communicating inwardly into said needle opening and downwardly into said upper block groove; an annular seal in said seal chamber enlargement spaced at all times outwardly of said piercing needle and said pipeline pierced opening, said seal being generally vertically compressed upwardly against said upper block and downwardly against said pipeline sealing said pipeline pierced opening upwardly from said upper block groove; said lower block groove being formed semi-circular in transverse cross section, said upper block groove being formed semi-elliptical in transverse cross section, a lower portion of said upper block groove being formed with a greater radius than an upper portion of said groove with the surfaces of said groove upper and lower portions blending smoothly one into the other; said block grooves and said pipeline being respectively dimensioned so that said assembled securement of said blocks into abutment around said pipeline forces deformation of said pipeline against said blocks and totally conforming to said block grooves including said upper part of said normally circular cross section pipeline being deformed into and conforming to said upper block groove semi-elliptical transverse cross section to increase the rigidity of said upper part of said pipeline and avoid deformation of said upper part of said pipeline and leakage about said seal during piercing thereof by said downwardly moving piercing needle.

2. In a line tap valve as defined in claim 1 in which said lower block groove has a shim positioned therein outwardly conforming to said groove and inwardly formed semi-circular in cross section forming said groove of reduced semi-circular dimensions with diametrically opposite steps at lower portions of said upper block groove; and in which said upper block groove and said shim reduced lower block groove and said pipeline are respectively dimensioned so that said assembled securement of said blocks into abutment around said pipeline forces deformation of said pipeline against said blocks and totally conforming to said block grooves including said shim steps.

3. In a line tap valve of the type having upper and lower blocks with registering grooves therein for assembly secured abutting and telescoping a normally circular transverse cross section pipeline to be tapped, the upper block mounting a generally vertically adjustable and peripherally sealed piercing needle selectively movable downwardly through a needle opening penetrating the upper block groove to transversely pierce an opening in an upper part of the pipeline, said needle then being movable back upwardly providing communication through the pipeline pierced opening and the needle opening into a transfer passageway of the upper block; the improvements comprising: said lower block groove being formed semi-circular in transverse cross section; said upper block groove being formed semi-elliptical in transverse cross section and having a lower portion formed with a radius greater than a radius of an upper portion of said groove with the surfaces of said groove upper and lower portions blending smoothly one into the other; said block grooves and said pipeline being respectively dimensioned so that said assembled securement of said blocks into abutment around said pipeline forces deformation of said pipeline against said blocks and totally conforming to said block grooves including said upper part of said normally circular cross section pipeline being deformed into and conforming to said upper block groove semi-elliptical transverse cross section to increase the rigidity of said upper part of said pipeline and avoid deformation of said upper part of said pipeline during piercing thereof by said downwardly moving piercing needle.

4. In a line tap valve as defined in claim 3 in which said lower block groove has a shim positioned therein outwardly conforming to said groove and inwardly formed semi-circular in cross section forming said groove of reduced semi-circular dimensions with diametrically opposite steps at lower portions of said upper block groove; and in which said upper block groove and said shim reduced lower block groove and said pipeline are respectively dimensioned so that said assembled securement of said blocks into abutment around said pipeline forces said deformation of said pipeline against said blocks and totally conforming to said block grooves including said shim steps.

* * * * *